DEVICE FOR ADJUSTING THE GAIN OR ATTENUATION OF AN ELECTRIC WAVE
Filed Feb. 19, 1959 3 Sheets-Sheet 1

INVENTOR
JACQUES OSWALD
BY Paul M. Craig, Jr.
ATTORNEY

May 1, 1962 J. OSWALD 3,032,724

DEVICE FOR ADJUSTING THE GAIN OR ATTENUATION OF AN ELECTRIC WAVE

Filed Feb. 19, 1959 3 Sheets-Sheet 2

INVENTOR
JACQUES OSWALD
BY Paul M. Craig, Jr.
ATTORNEY

INVENTOR
JACQUES OSWALD
BY Paul M. Craig, Jr.
ATTORNEY

United States Patent Office 3,032,724

Patented May 1, 1962

3,032,724

DEVICE FOR ADJUSTING THE GAIN OR ATTENUATION OF AN ELECTRIC WAVE

Jacques Oswald, Versailles, France, assignor to Compagnie Industrielle des Telephones, Paris, France, a corporation of France Filed Feb. 19, 1959, Ser. No. 794,453
Claims priority, application France Feb. 28, 1958
13 Claims. (Cl. 333—17)

Devices for adjusting the gain or attenuation of a direct or alternating electric wave generally comprise means for adjusting by means of a direct current which is obtained from a rectified voltage and of which the variations modify the impedance of non-linear elements of regulating networks and consequently the attenuation produced by these networks. However, these devices are subject to certain defects, due to the dispersion of the characteristics of their non-linear elements, as also to the influence of temperature on the characteristics of these elements. In order to obviate these disadvantages, applicant has proposed in his French patent applied for on Dec. 9, 1957, for "Device for Varying the Gain or Attenuation of an Electric Wave, Comprising Two Amplitude Modulators Operating With a Regulated Control Frequency" (invention: Jean-Louis Hurault), a device comprising two amplitude modulators, of which one receives the wave at its input terminals, and the other restores the said wave at a different level at its output terminals, the said two modulators being fed from a common modulating voltage source, the frequency of which is adjustable under the action of a control voltage, and being connected together by a network which effects a variable attenuation as a function of the frequency of the modulating voltage.

In contrast thereto, the device according to the present invention is characterised by the fact that it comprises two modulators directly connected together and fed from a common fixed-frequency carrier voltage source, and a member disposed between the said carrier voltage source and one of the modulators, so as to produce between the carrier voltage of the two modulators a phase shift which depends upon the value of a control voltage applied to the said member.

Such a device undoubtedly has less flexibility than the aforesaid known device, which permits of choosing at will the attenuation-frequency characteristic of the network inserted between the two modulators, but it can operate with a single oscillator for the individual adjustment of a number of channels, and is therefore more economic when employed in compandor installations.

Figure 1:
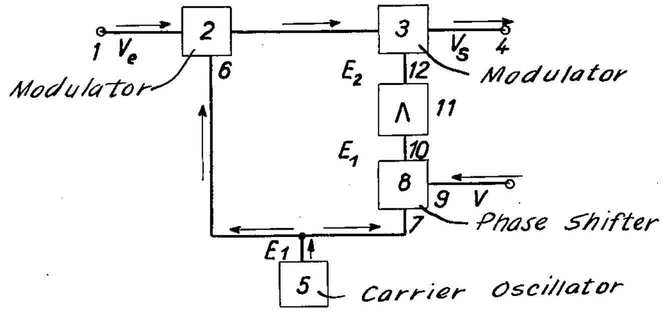

FIGURE 1 illustrates the general circuit diagram of the device according to the invention, in the case where the control voltage is invariable in direction, and is independent of the instantaneous or mean levels of the waves at the input and at the output of the device. In this figure, 1 designates the input of the first modulator, to which there is applied a wave at the voltage $V_e$, 2 and 3 designate respectively the two amplitude modulators of the inversion type, and 4 designates the output of the second modulator, at which the wave is collected at a voltage $V_s$. Finally, 5 designates the auxiliary oscillator, which supplies a carrier voltage $E_1=A\cos\Omega t$. This voltage is applied on the one hand directly to the terminals 6 of the first modulator 2, and on the other hand through a phase shifter 8 and an amplifier 11 to the terminals 12 of the second modulator 3.

The phase shifter 8 comprises a control circuit, to the terminals 9 of which there is applied a voltage V, while there is collected at the terminal 10 of its output circuit a voltage $E'_1=A'\cos(\Omega t-\varphi)$ which is phase-shifted by an angle $\varphi$ dependent upon V in relation to the voltage $E_1=A\cos\Omega t$ applied to its input circuit at 7.

The phase shifter 8 may be established in two different forms. In the first form, the phase-shift angle $\varphi$ which it produces is such that $\tan\varphi$ is proportional to the control voltage V which is applied thereto:

$$\tan\varphi=\frac{V}{V_0}$$

$V_0$ designating the value of the control voltage corresponding to a phase shift of $\pi/4$. In the following, this type of phase shifter will be called "type $D_1$" phase shifter.

In the second form of construction, the phase shifter is so designed that $\tan\varphi$ is inversely proportional to the control voltage V:

$$\tan\varphi=\frac{V_0}{V}$$

In the following, this type of phase shifter will be called the "type $D_2$" phase shifter. The applications of these two types of phase shifter will hereinafter be explained.

If the amplifier 11 connected between the output 10 of the phase shifter and the control terminals 12 of the modulator 3 introduces no phase shift, the voltage across the said control terminals is $E_2=B\cos(\Omega t-\varphi)$, also phase-shifted by $\varphi$ in relation to the control voltage of the first modulator.

If the modulators operate in the linear zone of their characteristic curve, the two modulators in series introduce a transfer factor as a voltage proportional to $$\frac{\pi}{2}|\varphi|$$

(with $-\pi<\varphi<\pi$); the output voltage $V_s$ is therefore equal to $$mV_e\frac{\frac{\pi}{2}-|\varphi|}{\frac{\pi}{2}}=\frac{2m}{\pi}V_e\left(\frac{\pi}{2}-|\varphi|\right)$$

*m* being a constant lower than 1.

If the phase shifter is of the $D_1$ type, we have:

$$\tan\varphi=\frac{V}{V_0}$$

hence $$V_s=\frac{2m}{\pi}V_e\arctan\frac{V}{V_0} \tag{1}$$

If $$\frac{V}{V_0}\gg 1$$

(a ratio of 2 is also admissible), the phase shift $\varphi$ is in the neighbourhood of $\pi/2$, and consequently $$\frac{\pi}{2}-\varphi$$

is low and can be assimilated to $\cos\varphi$ or $\cot\varphi$. We therefore have approximately:

$$V_s\simeq\frac{2m}{\pi}V_e\frac{V_0}{V} \tag{1'}$$

and the voltage transfer factor is inversely proportional to the control voltage. The device thus constructed therefore supplies a voltage proportional to the quotient of two voltages ($V_e$:$V$), of which the second V does not change in direction. If, however, the voltage V changed direction, there would be obtained a voltage proportional to $V_e/V$.

If, on the other hand, the phase shifter is of the $D_2$ type, we have $$\tan \varphi=\frac{V}{V_0}$$

and:

$$(2)\qquad V_s=\frac{2m}{\pi}V_e \arctan \frac{V}{V_0}$$

If $$\frac{V}{V_0}\ll 1$$

(a ratio of 1:2 is also suitable), arc tan $V/V_0$ can be assimilated to $V/V_0$, so that we have approximately:

$$(2')\qquad V_s\simeq\frac{2m}{\pi}V_e\frac{V}{V_0}$$

The voltage transfer factor is therefore proportional to the control voltage in this case. The device thus constructed therefore permits of obtaining a voltage proportional to the product of two voltages ($V_e \times V$), with the same condition for V as in the previous case.

There will now be described the applications of the device according to the invention to installations for the regulation, compression or expansion of the instantaneous amplitudes of electric signals.

(1) There will first be considered the case where it is desired to effect a compression of the applied wave, that is to say, to obtain a wave $V_s$, the amplitude of which is proportional to the square root of that of the applied wave $V_e$.

In this case, the type $D_1$ phase shifter is chosen, and its control circuit is fed with the output voltage from the second modulator. We therefore have $V=V_s$ and the equation which expresses the value of the output voltage $V_s$ as a function of the input voltage $V_e$ becomes:

$$V_s\simeq\frac{2m}{\pi}V_e\frac{V_0}{V_s}$$

that is to say:

$$V_s\simeq\sqrt{\frac{2mV_0}{\pi}}\sqrt{V_e}$$

The desired compression of the input voltage is therefore obtained, but subject to the condition that:

$$V_e\gg\frac{\pi}{2m}V_0$$

or again, the following may be sufficient:

$$V_e\gg\frac{2\pi}{m}V_0$$

(2) There will now be described the case where it is desired to obtain a regulation effect, that is to say, to maintain constant the voltage of the collected wave.

In this case, the type $D_1$ phase shifter is again chosen, and its control circuit is fed with the voltage applied to the input of the first modulator.

We then have $V=V_e$, so that:

$$V_s\simeq\frac{2m}{\pi}V_0$$

The output voltage $V_s$ is therefore constant, and the desired regulation effect is obtained, subject to the condition:

$$V_e\gg V_0$$

or again:

$$V_e\gg 2V_0$$

(3) The case will now be considered where it is desired to effect a quadratic expansion of the applied wave, that is to say, to obtain a wave $V_s$ whose amplitude is proportional to the square of that of the applied wave $V_e$.

In this case, the type $D_2$ phase shifter is chosen, and its control circuit is fed with the input voltage $V_e$. We then have:

$$V_s\simeq\frac{2m}{\pi}\frac{V_e^2}{V_0}$$

This is the desired law of expansion, which is the inverse of the preceding law of compression, subject to the condition:

$$V_e\ll V_0$$

or at least:

$$V_e\ll\frac{V_0}{2}$$

(4) The case will finally be considered where it is desired to provide a threshold device, that is to say, a device which provides an output voltage only if the input voltage is higher than a given value.

In this case, the type $D_2$ phase shifter is chosen, and its control circuit is fed with the output voltage $V_s$ of the second modulator.

In this case, by making $V=V_s$ in the previously established Equation 2, we have:

$$V_s=\frac{2m}{\pi}V_e \arctan \frac{V_s}{V_0}$$

which may be written:

$$\tan\frac{V_s}{2mV_e}=\frac{2mV_e}{\pi V_0}\frac{\pi V_s}{2mV_e}$$

and only admits of the solution $V_s=0$ with $$\frac{V_e}{V_0}\frac{\pi}{2m}$$

The device according to the invention will therefore give an output voltage different from zero only if the input voltage $V_e$ is higher than $$\frac{\pi}{2m}V_0$$

There will now be described the application of the device according to the invention to the compression and expansion of the amplitude of the speech-frequency envelope of a telephone signal.

As in the previous case, the compressor device is formed by using a type $D_1$ phase shifter, and the control voltage of the latter, which is at a relatively high level, is extracted on the output side of the second modulator. Similarly, the expander device is formed by using a type $D_2$ phase shifter, of which the control voltage, which is at a relatively low level, is extracted on the input side of the first modulator.

Figure 2:
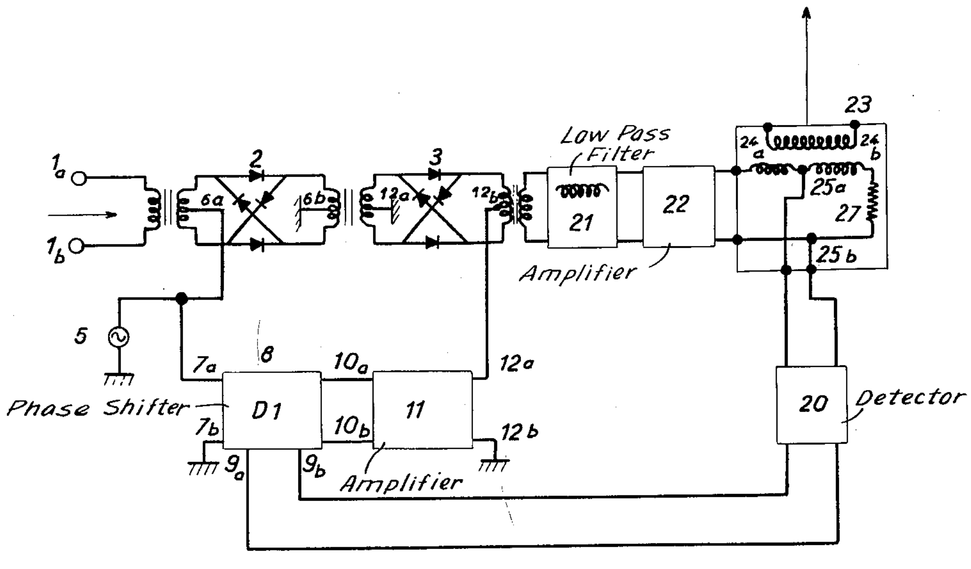

FIGURE 2 shows the circuit diagram of the compressor device. The voice-frequency telephone signal to be compressed is applied to the terminals 1*a*, 1*b*. The modulators 2 and 3 are ring-type modulators. The control terminals 6*a*, 6*b* of the first modulator are connected to the terminals of the oscillator 5, and the control terminals 12*a*, 12*b* of the second modulator are connected to the output terminals of the amplifier 11, the input terminals 10*a*, 10*b*, of which are connected to the output terminals of the type $D_1$ phase shifter 8.

This phase shifter receives at its input terminals 7*a*, 7*b* the voltage of the oscillator 5, and its control terminals 9*a*, 9*b* are connected to the output terminals of a device 20 of known type which detects the speech-frequency envelope of the signal collected at the output of the device.

There are disposed at the output of the modulator 12 a low-pass filter 21 for eliminating any undesirable frequencies emanating from the modulators, and an amplifier 22, at the output of which there is disposed a differential eight-terminal network 23, at the terminals 24*a*, 24*b* of which the compressed telephone signals are collected, while its terminals 25*a*, 25*b* are connected to the input terminals of the detector device 20, and its terminals 26, 26' are connected to a balancing network 27.

Figure 3:
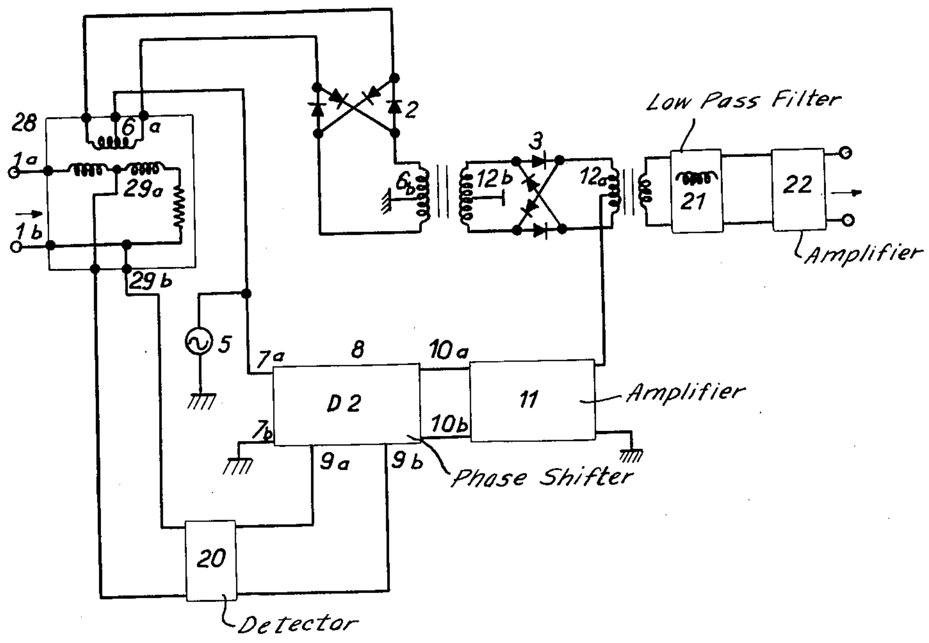

FIGURE 3 illustrates the circuit diagram of the expandor device, which comprises a type $D_2$ phase shifter 8. A differential eight-terminal network 28 is connected to the input of the device, and the incident signals are applied to its input terminals 1*a*, 1*b*. The speech-frequency voltage detector 20 has its input terminals connected to the terminals 29*a*, 29*b* of the eight-terminal network and its output terminals connected, as before, to the control terminals 9*a*, 9*b* of the phase shifter, while the transformer of the eight-terminal network serves as an input transformer for the modulator 2. The modulator 3 is succeeded, in the compressor device by a filter 21 and an amplifier 22, at the output of which there are collected the signals at the desired level which have received the desired expansion.

There will now be described in greater detail the types $D_1$ and $D_2$ phase shifters used in the devices hereinbefore described. The principle of these phase shifters is known, and their constructional forms do not form part of the present invention.

Figure 4:
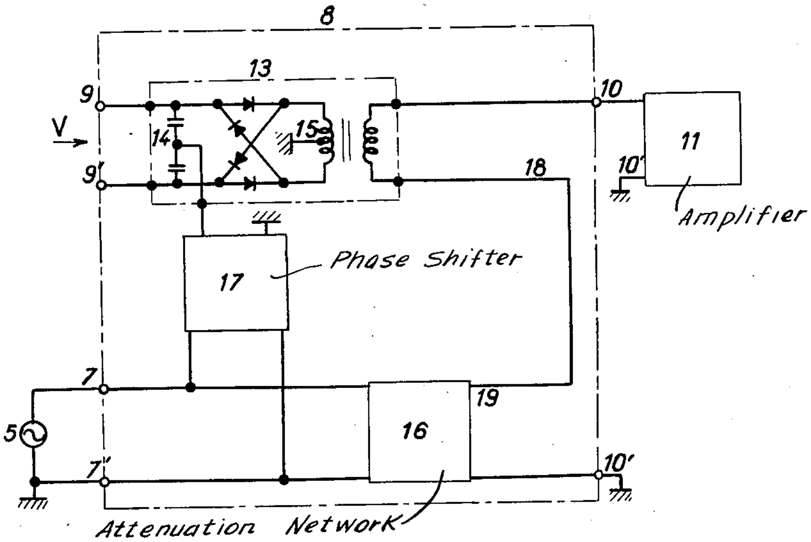

FIGURE 4 shows the circuit diagram of a type $D_1$ phase shifter producing a phase shift whose tangent is proportional to the control voltage.

The input terminals 7, 7′ (the terminal 7′ being earthed) received the voltage from the oscillator 5. They are connected on the one hand to the input terminals of a variable attenuation network 16 consisting of resistances, and on the other hand to the input terminals of an auxiliary phase shifter 17 which produces an effective phase shift of $\pi/2$ at the frequency $\Omega/2\pi$ of the voltage of the oscillator 5, so that the voltage at the output of this phase shifter is $$A\cos\left(\Omega t=\frac{\pi}{2}\right)=A\sin\Omega t$$

This voltage is applied to the control terminals 14, 15 of a ring-type modulator 13.

The output terminals 18 of the modulator 13 and the output terminals 19 of the attenuation network 16 are connected in series in the input circuit 10, 10′ of the amplifier 11. The control voltage V is applied to the input terminals 9, 9′ of the modulator 13.

Under these conditions, the modulator supplies an output voltage $m'V\sin\Omega t$, subject to linear operation, with the aid of a filtering device not shown. On the other hand, the voltage across the output terminals of the attenuation network 16 is $kA\cos\Omega t$, $k$ designating the voltage transfer factor of 16 on open circuit. Therefore, there exists across the output terminal 10, 10′ of the device 8, that is, at the input of the amplifier 11, a voltage $E'_1$ of the form:

$$E'_1=A'\cos(\Omega t-\varphi)=kA\cos\Omega t=m'V\sin\Omega t$$

with $$\tan\varphi=\frac{m'V}{kA}=\frac{V}{V_0}$$

and $$A'=kA\sqrt{1+\frac{V^2}{V_0^2}}$$

if $$V_0=\frac{kA}{m'}$$

It will be seen that the amplitude A′ of this voltage varies considerably with V, if $V/V_0$ is made very much greater than 1, in order that the approximate Formula 1′ may be applied. This shows the desirability of inserting an amplifier such as 11 between the phase shifter 8 and the modulator 3, in the case where the voltage V is capable of considerable variation, in order to ensure that, with the smallest values of this voltage, the modulator will still operate in its linear zone. A limiting at the output of the amplifier may also be utilised.

Figure 5:
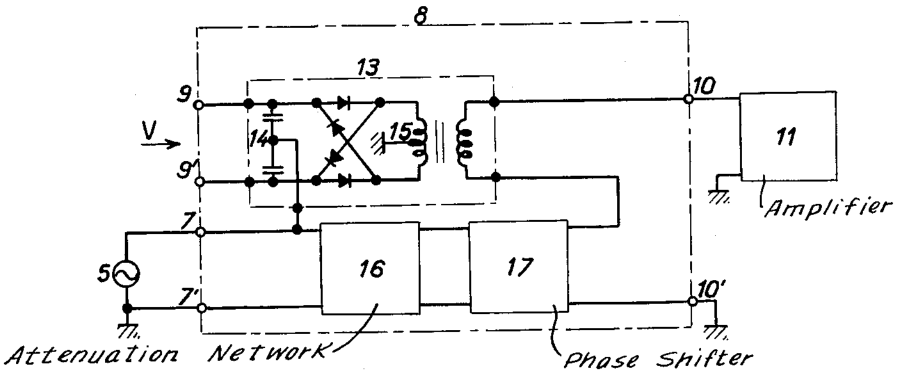

FIGURE 5 illustrates the circuit diagram of a type $D_2$ phase shifter. This circuit diagram differs from that of FIGURE 4 in that the auxiliary phase shifter 17 is connected to the output of the attenuation network 16.

There is obtained at the output of the device, between the terminals 10, 10′, a voltage:

$$E''_1=m'V\cos\Omega t+kA\sin\Omega t=A'\cos(\Omega t-\varphi)$$

If $V/V_0$ is made very much smaller than 1 (or is merely made smaller than or equal to ½) the amplitude A′ varies only slightly with V, and the feeding of the modulator 3 could be effected without an amplifier in some cases.

As has already been indicated, the device comprising a type $D_1$ phase shifter (FIGURE 4) permits of obtaining a voltage proportional to the quotient of two voltages, and the device comprising a type $D_2$ phase shifter (FIGURE 5) permits of obtaining a voltage proportional to the product of two voltages. It is important to note that these results are obtained by using only modulators which operate in their linear operating zone. The voltage ranges within which the described devices may be applied are very wide, which is not the case when modulators are employed in the zone in which they give directly an output current proportional to the product of the input and control voltages.

I claim:

1. In a device for adjusting the gain or attenuation of an electric signal, two modulators provided with input terminals, control terminals and output terminals, the signal to be adjusted being applied to the input terminals of the first modulator, the output terminals of the first modulator being directly connected to the input terminals of the second modulator, and the adjusted signal being collected at the output terminals of the second modulator, a source of alternating potential of fixed frequency, means for connecting said source on one hand directly to the control terminals of one of the modulators and, on the other hand, to the control terminals of the other modulator by means of an amplifier and a phase-shifting means provided with control terminals, and a potential source of constant polarity connected to said control terminals of said phase-shifting means.

2. Device according to claim 1, characterised in that the phase-shifting means is of a so-called $D_1$ type so constructed and arranged as to produce a phase shift whose tangent is proportional to the control voltage.

3. Device according to claim 2, characterised in that, for the purpose of ensuring that the transfer factor of the electric signal between the output of the second modulator and the input of the first modulator is inversely proportional to the control voltage, the phase-shifting means is of the so-called $D_1$ type, and is so constructed and arranged as to produce a phase shift greater than $\pi/4$.

4. Device according to claim 2, characterised in that, for the purpose of obtaining an output voltage whose amplitude is proportional to the square root of the amplitude of the input voltage, the phase-shifting means is of the so-called $D_1$ type, and its control circuit is connected to the output circuit of the second modulator.

5. Device according to claim 2, characterised in that, for the purpose of obtaining an output voltage whose amplitude is substantially independent of the amplitude of the input voltage, the phase-shifting means is of the so-called $D_1$ type, and its control circuit is connected to the input of the first modulator.

6. Device according to claim 2, wherein said device is a compressor for the purpose of effecting the compression of telephone signals, the phase-shifting means is of the so-called $D_1$ type and is so constructed and arranged as to produce a phase shift greater than $\pi/4$, and a device for detecting the speech-frequency envelope of the applied signals is connected between, on the one hand, two terminals of a separating device connected on the output side of the compressor, and, on the other hand, the terminals of the phase shifter.

7. Device according to claim 1, characterised in that the phase-shifting means is of a so-called $D_2$ type so constructed and arranged as to produce a phase shift whose tangent is inversely proportional to the control voltage.

8. Device according to claim 7, characterised in that, for the purpose of ensuring that the transfer factor of the electric signal between the output of the second modulator and the input of the first modulator is proportional to the control voltage, the phase-shifting means is of the so-called $D_2$ type and is so constructed and arranged as to produce a phase shift smaller than $\pi/4$.

9. Device according to claim 7, characterised in that, for the purpose of obtaining an output voltage whose amplitude is proportional to the square of the amplitude of the input voltage, the phase-shifting means is of the so-called $D_2$ type, and its control circuit is connected to the input of the first modulator.

10. Device according to claim 7, characterised in that, for the purpose of obtaining an output voltage whose amplitude is zero with amplitudes of the input voltage lower than a given value, the phase-shifting means is of the so-called $D_2$ type and its control circuit is connected to the output of the second modulator.

11. Device according to claim 7, wherein said device is an expander for effecting the expansion of telephone signals, the phase-shifting means is of the so-called $D_2$ type and is so constructed and arranged as to produce a phase shift smaller than $\pi/4$, and a device for detecting the speech-frequency envelope of the applied signals is connected between, on the one hand, two terminals of a separating device connected on the output side of the expander, and, on the other hand, the control terminals of the phase shifter.

12. Device for adjusting the amplitude change of an electric signal by means of control voltage, characterised in that it comprises, in cascade with a circuit carrying the signal, two modulators directly connected together, said modulators having control circuits and a common fixed-frequency carrier voltage source feeding said control circuits, a phase-shifting means connected between said source and one of the modulators and having terminals for applying said control voltage thereto, said one modulator being responsive to said phase-shifting means so as to produce between the carrier voltages of the two modulators a phase shift which depends upon the value of said control voltage applied to the said phase-shifting means and voltage source means for applying the control voltage to said terminals.

13. In a device for adjusting the gain or attenuation of an electric signal, two modulators provided with input terminals, control terminals and output terminals, the signal to be adjusted being applied to the input terminals of the first modulator, the output terminals of the first modulator being connected to the input terminals of the second modulator, and the adjusted signal being collected at the output terminals of the second modulator, a source of alternating potential of fixed frequency, means for connecting said source on one hand to the control terminals of one of the modulators and, on the other hand, to the control terminals of the other modulator by means of a phase-shifting means provided with control terminals, and voltage source means for connecting a control voltage to said control terminals of the phase-shifting means.

References Cited in the file of this patent

UNITED STATES PATENTS

| | | |
|---|---|---|
| 1,964,522 | Lewis | June 26, 1934 |
| 2,358,045 | Barney | Sept. 12, 1944 |